Patented Dec. 19, 1933

1,940,065

UNITED STATES PATENT OFFICE 1,940,065

SEPARATION AND PURIFICATION OF ORTHO, META AND PARA XYLENE

Hans Spannagel, Leverkusen-on-the-Rhine, and Eduard Tschunkur, Cologne-Mulheim, Germany, assignors to I. G. Farbenindustrie Aktiengesellschaft, Frankfort-on-the-Main, Germany, a corporation of Germany No Drawing. Application December 12, 1928, Serial No. 325,649, and in Germany December 15, 1927

2 Claims. (Cl. 260—168)

The present invention relates to the separation and purification of ortho, meta, and para-xylene from crude xylene, technically pure xylene or solvent naphtha containing xylene.

No simple physical methods have so far been known for the separation of ortho, meta and para xylenes from crude xylene, technically pure xylene or solvent naphtha containing xylene.

For the manufacture of pure xylenes it was necessary to have recourse to cumbersome chemical methods of separation, such as for example, sulfonation of the techinically pure xylene, separation of the sulfonic acids or of the salts thereof by crystallization and subsequent hydrolysis of the pure sulfonic acids thus obtained for producing the corresponding xylenes therefrom; it follows that the application of so many operations is very troublesome and costly.

In accordance with the present invention the three isomeric xylenes can be separated in a comparatively cheap and simple manner from crude xylene, technically pure xylene or also from solvent naphtha containing xylene and purified by fractionating carefully the primary materials, repeatedly if necessary, in an efficient distillation- (rectification)-apparatus of any suitable origin and construction, so that with the first runnings are distilled off any aliphatic hydrocarbons, ethyl benzene and the like, boiling below para and meta xylene, and with the last running primarily the ortho xylene, this being ascertained by testing the individual fractions with regard to boiling point, specific gravity and freezing point. Generally we work up the mixtures into three fractions; the first boiling below 136° C., the second boiling from 136°–140° C., and the third boiling above 140° C.

The pure second fraction, thus obtained, consists essentially, after it has been fractionated repeatedly, if necessary, of a mixture of varying quantities of meta and para xylene and is almost completely free from ortho xylene (for example, it contains 20–30% of para xylene and about 60–70% of meta xylene). The mixture of meta and para xylene is then thoroughly cooled down to a temperature within the range from about −30° as the upper limit to about −60° as the lower limit, whereby almost all the para xylene can be obtained in well formed crystals which are separated from the meta xylene (mother liquor), for example, by filtration.

The thoroughly cooled mother liquor obtained from the separation of the para xylene which is rich in meta xylene is cooled further, advantageously in a second low temperature cooling chamber, down to a temperature of about −60 to about −100° C., whereby the meta xylene separates in crystalline form and can be separated. Should the separating crystalline magma be too thick, it will be advantageous to carry out the crystallization either in two stages at different temperatures or with the addition of an indifferent, easily volatile solvent, for example, benzine, alcohol, ether, acetone.

The meta and para xylenes obtained by the above described crystallization by means of low temperature cooling are not yet completely pure after the first separation and are purified by re-crystallization at a correspondingly low temperature, that means, the para xylene having a melting point of +15° C. is cooled down to about +2° C. and the meta xylene to about −60 to −70° C., whereby the pure xylenes crystallize and can be separated from the mother liquor, for example, by filtration.

If desired, the meta and para xylene may be re-crystallized with the addition of a suitable indifferent, easily volatile solvent, such as for example, toluene, benzine, methanol, ethanol, acetone, ether and the like. In this case the temperatures required for the crystallization are lower, for example, for the para xylene about −30° to about −60° C., and for the meta xylene about −90° to about −100° C. The mother liquors resulting from the re-crystallization are, after removal of the solvent, returned for further treatment to the distillation on their first crystallization depending on their respective composition.

The third fraction boiling above 140° C. consists essentially of ortho xylene containing, for example, about 80–90% ortho xylene. For more complete purification, it is recrystallized at correspondingly low temperatures, for example, at about −30 to −50° C., with the addition of an indifferent, easily volatile solvent if desired, such as, for example, toluene, benzine, methanol, ethanol, acetone, ether and the like. The solvent is advantageously recovered by fractional distillation.

The separation of the xylenes can also be effected successfully by first freezing out and removing the para xylene from the technically pure xylene of commerce (which, besides meta xylene as the main constituent, contains about 15% of para and about the same quantity of ortho xylene) on cooling down the mixture to an appropriate low temperature of about −30 to −60° C. The mother liquor, essentially consisting of ortho and meta xylene, is then subjected to a low temperature cooling process, whereby the mixtures of ortho and meta xylene crystallizes at about —60 to —100° C. From the mixture, ortho and meta xylene are separated by cooling down to about —60 to —90° C., whereby the ortho xylene crystallizes out. Subsequently, the mother liquor is cooled down to about —100° C., whereby the meta xylene crystallizes out. The temperatures required depend on the composition of the mixture.

Moreover, the process can also be carried out by freezing out and separating the para xylene from the technically pure xylene on cooling down the mixture to an appropriate low temperature of about —30 to —60° C., as above described, then separating the mother liquor which has been obtained from the freezing operation and contains meta and ortho xylene by fractional distillation into meta xylene and ortho xylene, and purifying the products thus obtained by recrystallization at a correspondingly low temperature, with the addition of an appropriate indifferent solvent if desired, as above described.

The freezing out, crystallization and removal of the crystals of the xylenes can be carried out technically in the customary double walled stirring vessel and filters, or in insulated stirring vessels and filters provided with cooling worms for low temperature cooling.

The temperatures applied during the crystallization process at low temperatures are varied within wide limits depending on the composition of the individual distillation fractions.

The invention is illustrated by the following examples, without being limited thereto:

*Example 1.*—250 kgs. of the final runnings of a xylene fractionation, boiling above 140° C., are cooled to —40° C. with stirring in a cooling vessel provided with a cooling jacket and cooling worms. The ortho xylene crystallizes out in the course of about 1 to 2 hours, whereupon the contents of the vessel are put on a filter provided with a suitable cooling apparatus. The crystalline mass is thoroughly filtered off.

The yield amounts to 120 kg. of ortho xylene of the freezing point —29° C.

*Example 2.*—250 kgs. of fractionated xylene containing about 20% of para xylene and about 60-70% meta xylene are cooled to —30 to —60° C. in the cooling vessel mentioned in Example 1. After about 4 hours the content of the vessel is filtered on the cooled filter; about 60 kg. of 85–95% para xylene are thus obtained. In order to obtain a para xylene of higher percentage the product obtained on filtration is washed with cooled alcohol whereby, after distilling off the alcohol mixed with it, a 98% para xylene is obtained.

The mother liquor is then reintroduced into the cooling vessel and cooled down to about —60 to about —100° C., and after about 3 hours the content of the vessel is centrifuged; about 95 kg. of 80–90% meta xylene are thus obtained. A meta xylene of about 97% is obtained by cooling down the product of a content of 80–90% to about —60 to —70° C. and separating the crystals from the mother liquor.

*Example 3.*—250 kg. of technically pure xylene, containing about 15% para xylene, 15% ortho xylene and 60% meta xylene, are introduced into the cooling vessel mentioned in Example 1 and cooled down to —40 to —60° C. After about 4 hours the crystals of para xylene are separated by centrifuging the content of the vessel. The mother liquor consisting essentially of ortho and meta xylene is cooled down to a low temperature of —60 to —100° C., whereby a mixture of ortho and meta xylene separates. The mixture of ortho and meta xylene is then cooled down to —40 to —60° C., whereby the ortho xylene separates possessing a melting point of 28° C. By cooling down the mother liquor, for example, to —60° C., the meta xylene of the melting point —45° C. is separated.

The xylenes thus obtained are not completely pure and are purified by recrystallization.

In the claims, the term "a mixture containing the three isomeric xylenes" comprises crude xylene, technically pure xylene and solvent naphtha containing xylene.

We claim:

1. In a process of separating and purifying isomeric xylenes from crude xylene, the step which consists in cooling to a temperature between —30 and —60° C. a mixture of xylenes consisting essentially of para-xylene and meta-xylene with substantially no ortho-xylene, the mixture containing more para-xylene than is necessary to form a eutectic with all of the meta-xylene present, whereby a substantial crystallization of said para-xylene results, and separating the resulting crystals.

2. The process of separating para-xylene from crude xylene, which comprises obtaining from the crude xylene by fractional distillation the fraction boiling between 136° to 140° C., said fraction containing more para-xylene than is necessary to form a eutectic with all of the meta-xylene present therein, cooling said fraction to a temperature within the range from about —30 to about —60° C., whereby a substantial crystallization of said para-xylene results, and separating the resulting crystals.

HANS SPANNAGEL. [L. S.]
EDUARD TSCHUNKUR. [L. S.]